US 9,802,315 B2

(12) United States Patent
Kanemoto (10) Patent No.: US 9,802,315 B2
(45) Date of Patent: Oct. 31, 2017

(54) CONTROLLER FOR MOBILE ROBOT

(71) Applicant: HONDA MOTOR CO., LTD., Tokyo (JP)

(72) Inventor: Yoshiki Kanemoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 14/931,092

(22) Filed: Nov. 3, 2015

(65) Prior Publication Data

US 2016/0129591 A1 May 12, 2016

(30) Foreign Application Priority Data

Nov. 12, 2014 (JP) .................................. 2014-229693

(51) Int. Cl.

| | | |
|---|---|---|
| *G06F 19/00* | (2011.01) | |
| *B25J 9/16* | (2006.01) | |
| *B25J 13/08* | (2006.01) | |
| *B25J 19/02* | (2006.01) | |
| *B62D 57/032* | (2006.01) | |

(52) U.S. Cl.
CPC ........... *B25J 9/1635* (2013.01); *B25J 13/085* (2013.01); *B25J 13/088* (2013.01); *B25J 13/089* (2013.01); *B25J 19/023* (2013.01); *B62D 57/032* (2013.01); *B25J 9/1633* (2013.01); *G05B 2219/2638* (2013.01); *Y10S 901/01* (2013.01)

(58) Field of Classification Search
CPC ...... B25J 9/1635; B25J 9/1633; B25J 19/023; B25J 13/085; B25J 13/088; B25J 13/089; B25J 9/1637; B25J 13/086; G05B 2219/2638; Y10T 901/01; B62D 57/032; B62D 57/034

See application file for complete search history.

(56) References Cited

U.S. PATENT DOCUMENTS

| | | | | |
|---|---|---|---|---|
| 2002/0120361 | A1* | 8/2002 | Kuroki ................... | G05B 19/00 700/245 |
| 2009/0166103 | A1* | 7/2009 | Bowers .................. | A01B 51/02 180/8.1 |
| 2011/0160906 | A1* | 6/2011 | Orita ..................... | B62D 57/032 700/260 |
| 2011/0160907 | A1* | 6/2011 | Orita ...................... | B25J 9/1607 700/260 |
| 2011/0231050 | A1* | 9/2011 | Goulding ............. | B62D 57/024 701/26 |

FOREIGN PATENT DOCUMENTS

JP          5-305579          11/1993

* cited by examiner

*Primary Examiner* — Rachid Bendidi
(74) *Attorney, Agent, or Firm* — Rankin, Hill & Clark LLP (57) ABSTRACT

A link position and attitude estimating unit 53 (54) of a controller 40 of a mobile robot 1 sequentially estimates the actual position and attitude of a first particular link 2 by using input parameters which at least include at least one of a desired attitude of an in-contact-with-ground link 13 and an observation value of the actual attitude of the first particular link 2, a desired position of the in-contact-with-ground link 13, and an observation value of the actual displacement amount of each joint. The driving force for each joint is adjusted by using the estimated values.

10 Claims, 4 Drawing Sheets

CONTROLLER FOR MOBILE ROBOT

BACKGROUND OF THE INVENTION

Field of the Invention

The present invention relates to a controller for a mobile robot.

Description of the Related Art

In a mobile robot, such as a humanoid robot, which is composed of a base body and a plurality of links, which constitute leg link mechanisms or the like extended from the base body and which are interconnected through joints, the so-called position control is generally known (refer to, for example, Japanese Patent Application Laid-Open No. 5-305579). In the position control, the desired displacement amount of each joint is sequentially determined by inverse kinematics arithmetic processing or the like according to a desired motion (travel motion) of the mobile robot, and the displacement amount of each joint is controlled through a joint actuator such that the actual displacement amount follows the desired displacement amount.

According to the foregoing position control, the desired displacement amount of each joint is specified on the basis of a desired motion of the mobile robot, thus exhibiting poor flexibility in response to, for example, a change in an external force acting on the mobile robot.

In recent years, therefore, research has progressed on a technique for having a mobile robot travel by controlling the driving force for each joint through a joint actuator according to the so-called force control method.

According to the force control method, the desired driving force for each joint, i.e. each joint for moving a leg link mechanism, is determined by using an inverse kinematics model on the basis of a desired motion of the mobile robot, and the driving force for each joint is controlled through the joint actuator on the basis of the desired driving force.

In the case where the motion of a mobile robot is controlled according to the force control method, the displacement amount of each joint tends to change as an external force acting on the mobile robot (the contact reaction force from an external object) changes. This may cause the actual motion of the mobile robot to deviate from a desired motion or may impair the motion stability of the mobile robot.

Hence, it is considered desirable to estimate, by a certain means, the actual position and attitude (the position and attitude observed from outside the mobile robot) of a particular link, such as a link constituting the base body of the mobile robot, and to adjust, as necessary, the driving force for the joint supplied by the joint actuator on the basis of a difference between the estimated value and a desired value (the desired value in a desired motion) so as to reduce the difference.

In this case, desirably, the actual position and attitude of the particular link can be properly estimated by a simple method.

SUMMARY OF THE INVENTION

The present invention has been made in view of the background described above, and an object of the invention is to provide a controller capable of properly estimating the position and attitude of a particular link of a mobile robot by a simple method and utilizing the estimated values for controlling the motion of the mobile robot according to a force control method.

To this end, the present invention provides a controller for a mobile robot, which has a plurality of links which include a link constituting a base body and links constituting a plurality of leg link mechanisms extended from the base body and which are interconnected through a plurality of joints, and joint actuators for driving each of the joints, the controller being adapted to have the mobile robot travel by controlling driving forces to be imparted by the joint actuators to each of the joints for operating the leg link mechanisms according to a force control method, and the controller including:

a link position and attitude estimating unit configured to sequentially acquire input parameters, which at least include at least one of a desired attitude of a ground contact link of at least one leg link mechanism including a ground contact link that is in contact with a ground among the leg link mechanisms and an observation value of an actual attitude of a first particular link determined in advance among a plurality of links of the mobile robot, a desired position of the ground contact link, and an observation value of an actual displacement amount of each joint between the ground contact link and the first particular link, and to sequentially estimate the actual position and attitude of the first particular link by carrying out processing, which includes at least forward kinematics arithmetic processing, by using the input parameters; and a joint driving force control unit configured to adjust, through the joint actuator, a driving force to be imparted to each of the joints for operating the leg link mechanism based on at least either a difference between estimated values of the actual position and attitude of the first particular link obtained by the link position and attitude estimating unit and desired position and attitude of the first particular link or a difference between estimated values of actual position and attitude of a second particular link, which is different from the first particular link and which is not in contact with a ground, among the plurality of links of the mobile robot, wherein estimated values of the actual position and attitude of the second particular link are calculated by forward kinematics arithmetic processing on the basis of the estimated values of the actual position and attitude of the first particular link and an observation value of a displacement amount of each joint between the first particular link and the second particular link, and desired position and attitude of the second particular link, such that the difference is reduced (a first aspect of the invention).

In the present invention, the term "position and attitude" used for a ground contact link, the first particular link, and the second particular link means a set of position and attitude.

Further, the term "contact with ground" used for the ground contact link means a state in which the link is in contact with an external object such that the link is subjected to a contact reaction force. In this case, the external object is not limited to a floor or a ground, but may be any structure.

Further, in the present invention, the term "the observation value" of any state amount, such as the displacement amount of a joint or a load, means an estimated value which is estimated from the detection value of the state amount obtained by an appropriate sensor installed in the mobile robot or the detection value or values of one or more other state amounts having correlativity with the foregoing state amount (a detection value or values obtained by an appropriate sensor installed in the mobile robot) and which is estimated on the basis of the correlativity, or a pseudo estimated value that can be regarded to agree or substantially agree with the state amount. In this case, a desired value of the state amount, for example, can be used as the "pseudo estimated value".

Further, the "force control method" according to the present invention is a control method in which a desired driving force for each joint for operating each of the leg link mechanisms is determined from a desired motion of the mobile robot by using an inverse kinematics model and the driving force to be imparted to each joint for operating the leg link mechanism by the joint actuator is controlled according to at least the desired driving force.

In the first aspect of the invention described above, when attention is focused on the connection structure (link group) of the links from the ground contact link to the first particular link, if the position of one link other than the first particular link in the connection structure, the actual attitude of one link in the connection structure, and the actual displacement amount of each joint (each joint between the ground contact link and the first particular link) in the connection structure are known, then the actual position of the first particular link can be identified by the forward kinematics arithmetic processing or the like.

In the leg link mechanism, the actual position of the ground contact link, which is the link in contact with the ground, is the position of the ground contact link in a state in which the motion of the ground contact link is constrained by its contact with the ground. Further, the joint driving force control unit adjusts the driving force to be imparted to each joint for operating the leg link mechanism according to the difference on at least one of the first particular link and the second particular link thereby to reduce the difference.

Hence, the degree of agreement of the actual position and attitude of the ground contact link with desired position and attitude (the desired position and attitude in a desired motion of the mobile robot) is generally relatively high in the case where the actual shape and placement of an external object (the ground or the like) with which the ground contact link comes in contact substantially agree with those expected in a desired motion of a mobile robot.

Hence, the desired position and the desired attitude of the ground contact link can be regarded to substantially agree with the actual position and the actual attitude, respectively, of the ground contact link in a pseudo manner. Therefore, the desired position of the ground contact link can be used as an indicator of the actual position of one link in the connection structure. Similarly, the desired attitude of the ground contact link can be used as an indicator of the actual attitude of one link in the connection structure.

Further, the observation value of the actual attitude of the first particular link can be easily acquired on the basis of a detection signal of an appropriate sensor (e.g. an attitude sensor composed of a gyro sensor or the like) installed in the mobile robot. In this case, the observation value of the actual attitude of the first particular link can be used as an indicator of the actual attitude of one link in the connection structure.

Further, the observation value of the actual displacement amount of each joint between the ground contact link and the first particular link can be easily acquired with high accuracy by an appropriate sensor (e.g. a sensor composed of a rotary encoder, a potentiometer or the like) installed in the mobile robot.

The link position and attitude estimating unit carries out processing, which includes at least the forward kinematics arithmetic processing, by using the input parameters thereby to sequentially estimate the actual position and attitude of the first particular link.

Thus, the actual position and attitude of the first particular link can be estimated by a simple method.

Then, the joint driving force control unit adjusts the driving force to be imparted to each joint for operating the leg link mechanism according to the difference based on the estimated values of the actual position and attitude of the first particular link.

Thus, the first aspect of the invention makes it possible to properly estimate the position of a particular link of a mobile robot by the simple method and to use the estimated value for controlling the motion of the mobile robot according to a force control method.

In the first aspect of the invention described above, preferably, the second particular link is a link of a distal end portion of each of the leg link mechanisms, the link position and attitude estimating unit is configured to sequentially estimate the actual position and attitude of the first particular link and to sequentially estimate the actual position and attitude of the link of the distal end portion by forward kinematics arithmetic processing from the estimated values of the actual position and attitude of the first particular link and an observation value of a displacement amount of each joint between the first particular link and the link of the distal end portion while the link of the distal end portion is moving in the air in a travel motion of the mobile robot, and the joint driving force control unit is configured to adjust, through the joint actuator, the driving force to be imparted to each joint for operating the leg link mechanism on the basis of at least a difference between the estimated values of the actual position and attitude of the link of the distal end portion and the desired position and attitude of the link of the distal end portion such that the difference is reduced while the link of the distal end portion is moving in the air in the travel motion of the mobile robot (a second aspect of the invention).

According to the second aspect of the invention, the driving force to be imparted to each joint for operating the leg link mechanism is adjusted through the joint actuator on the basis of at least the difference between the estimated values of the actual position and attitude of the link of the distal end portion and the desired position and attitude of the link of the distal end portion such that the difference is reduced while the link of the distal end portion of the leg link mechanism is moving in the air in a travel motion of the mobile robot.

Thus, the degree of agreement between the actual position and attitude and the desired position and attitude of the link of the distal end portion when the link of the distal end portion comes in contact with the ground (the ground contact link), especially the degree of agreement between the actual position and the desired position, becomes higher. As a result, the desired position of the ground contact link, which is one of the input parameters, exhibits higher reliability as an indicator of the actual position of the ground contact link.

Further, if the desired attitude of the ground contact link is one of the input parameters, then the desired attitude of the ground contact link exhibits higher reliability as an indicator of the actual attitude of the ground contact link.

As a result, the reliability of the estimated values of the position and attitude of the first particular link or the estimated values of the position and attitude of the second particular link can be enhanced.

In the first or the second aspect of the invention described above, the input parameters may include the observation value of the actual attitude of the first particular link. In this case, more specifically, the link position and attitude estimating unit may adopt, for example, a mode described below.

The link position and attitude estimating unit is configured to carry out, at the time of determining a new estimated value of the actual position of the first particular link, first processing in which forward kinematics arithmetic processing is carried out on the basis of an observation value of an actual current attitude of the first particular link, a latest value among the estimated values of the actual position of the first particular link determined in the past, and an observation value of a current displacement amount of each joint between the ground contact link and the first particular link thereby to calculate a temporary value of the position of the ground contact link in the case where it is assumed that an actual current position of the first particular link agrees with the latest value, and second processing of determining a new estimated value of the actual position of the first particular link by correcting the latest value based on a difference between the temporary value of the position of the ground contact link and a desired position of the ground contact link, and to define the observation value of the actual attitude of the first particular link as an estimated value of the actual attitude (a third aspect of the invention).

According to the third aspect of the invention, the difference between the temporary value of the position of the ground contact link and the desired position of the ground contact link calculated by the first processing corresponds to the amount of deviation between the latest value of the estimated values of the actual position of the first particular link and the actual position of the first particular link.

Accordingly, a new estimated value of the actual position of the first particular link can be properly determined by correcting the latest value on the basis of the difference in the second processing.

Further, the observation value of the actual attitude of the first particular link can be used directly as the estimated value of the actual attitude of the first particular link.

Hence, the actual position and attitude of the first particular link can be properly estimated by the simple method.

In the meantime, the ground contact link tends to develop an elastic deformation due to the load attributable to a contact reaction force received from an external object with which the ground contact link comes in contact.

Therefore, in the third aspect of the invention described above, preferably, the input parameters further include an observation value of an actual load acting on the ground contact link, and the link position and attitude estimating unit is configured to further carry out third processing of estimating the amount of an elastic deformation of the ground contact link by using the observation value of the load and fourth processing of correcting the temporary value of the position of the ground contact link calculated by the first processing on the basis of an estimated value of the amount of the elastic deformation, and to correct the latest value based on a difference between a corrected value of the temporary value of the position of the ground contact link obtained by the fourth processing and the desired position of the ground contact link in place of the difference between the temporary value of the position of the ground contact link and the desired position of the ground contact link in the second processing, thereby determining a new estimated value of the actual position of the first particular link (a fourth aspect of the invention).

The fourth aspect of the invention makes it possible to sequentially determine the estimated value of the actual position of the first particular link such that the influence of a change in the position of the ground contact link caused by the elastic deformation of the ground contact link is compensated for. This permits even higher reliability of the estimated value of the actual position of the first particular link.

In the third or the fourth aspect of the invention, as an exemplary mode, the actual position of the first particular link can be estimated by using the temporary value of the position of any one of the ground contact links or the corrected temporary value thereof and a desired position during a phase in which each of the plurality of the leg link mechanisms has the ground contact link in the travel motion of the mobile robot.

However, in the third aspect of the invention, the link position and attitude estimating unit is preferably configured to carry out the first processing for each ground contact link in the phase during which each of the plurality of the leg link mechanisms has the ground contact link in the travel motion of the mobile robot, and to determine a new estimated value of the actual position of the first particular link by averaging the estimated values of the actual position of the first particular link obtained for each ground contact link by correcting the latest value based on the difference between the temporary value of the position of each ground contact link and the desired position of the ground contact link or by subjecting the value, which has been calculated by the averaging process, to a low-pass characteristic filtering process in the second processing (a fifth aspect of the invention).

Similarly, in the fourth aspect of the invention, the link position and attitude estimating unit is preferably configured to carry out the first processing, the third processing, and the fourth processing for each ground contact link in the phase during which each of the plurality of the leg link mechanisms has the ground contact link in the travel motion of the mobile robot, and to determine a new estimated value of the actual position of the first particular link by averaging the estimated values of the actual position of the first particular link obtained for each ground contact link by correcting the latest value based on the difference between the corrected value of the temporary value of the position of each ground contact link and the desired position of the ground contact link or by subjecting the value, which has been calculated by the averaging process, to a low-pass characteristic filtering process in the second processing (a sixth aspect of the invention).

According to the fifth or the sixth aspect of the invention, in the phase during which each of the plurality of leg link mechanisms has the ground contact link, the estimated values of the actual position of the first particular link obtained for each ground contact link are averaged, or the value calculated by the averaging process is subjected to the low-pass characteristic filtering process, thereby determining a new estimated value of the actual position of the first particular link. This arrangement makes it possible to achieve higher reliability or stability of the estimated value of the actual position of the first particular link, as compared with the case where the actual position of the first particular link is estimated by using the temporary value of the position of any one ground contact link or the corrected temporary value thereof, and the desired position during the foregoing phase.

Further, carrying out the foregoing filtering process makes it possible to smoothly change the estimated value of the actual position of the first particular link.

In the first or the second aspect of the invention, the input parameters may include a desired attitude of the ground contact link. In this case, more specifically, the link position and attitude estimating unit may adopt, for example, the following mode.

The link position and attitude estimating unit is configured to determine new estimated values of the actual position and attitude of the first particular link by carrying out sixth processing of determining the new estimated values of the actual position and attitude of the first particular link by forward kinematics arithmetic processing based on current values of desired position and attitude of the ground contact link and an observation value of a current displacement amount of each joint between the ground contact link and the first particular link (a seventh aspect of the invention).

According to the seventh aspect of the invention, the sixth processing uses the desired position and the desired attitude of the ground contact link as an indicator of the actual position and the actual attitude, respectively, of the ground contact link to determine the new estimated values of the actual position and attitude of the first particular link. Thus, the actual position and attitude of the first particular link can be properly estimated by the simple method.

As described above, the ground contact link is subjected to the load attributable to the contact reaction force received from an external object with which the ground contact link comes in contact, so that the ground contact link tends to develop an elastic deformation.

Therefore, in the foregoing seventh aspect of the invention, preferably, the input parameters further include an observation value of an actual load acting on the ground contact link, and the link position and attitude estimating unit is configured to further carry out seventh processing of estimating the amount of an elastic deformation of the ground contact link by using the observation value of the load and eighth processing of correcting the current values of desired position and attitude of the ground contact link by using the estimated value of the amount of the elastic deformation, and to determine new estimated values of the actual position and attitude of the first particular link by using the corrected values obtained by the eighth processing in place of the current values of the desired position and attitude of the ground contact link in the sixth processing (an eighth aspect of the invention).

According to the eighth aspect of the invention, the estimated values of the actual position and attitude of the first particular link can be sequentially determined such that the influence of a change in the position and attitude of the ground contact link caused by the elastic deformation of the ground contact link is compensated for. This permits even higher reliability of the estimated values of the actual position and attitude of the first particular link.

In the seventh or the eighth aspect of the invention, as an exemplary mode, the actual position of the first particular link can be estimated by using the values of the desired position and attitude of any one of the ground contact links or the corrected values thereof (the values corrected on the basis of the estimated value of the elastic deformation amount) during a phase in which each of the plurality of the leg link mechanisms has the ground contact link in the travel motion of the mobile robot.

However, in the seventh aspect of the invention, the link position and attitude estimating unit is preferably configured to determine the new estimated values of the actual position and attitude of the first particular link by averaging the estimated values of the position and attitude of the first particular link, which are calculated for each ground contact link by forward kinematics arithmetic processing based on the current values of the desired position and attitude of each ground contact link and the observation value of the current displacement amount of each joint between the ground contact link and the first particular link or by subjecting the values calculated by the averaging process to a low-pass characteristic filtering process in the sixth processing in the phase during which each of the plurality of the leg link mechanisms has the ground contact link in a travel motion of the mobile robot (a ninth aspect of the invention).

Similarly, in the eighth aspect of the invention, the link position and attitude estimating unit is preferably configured to carry out the seventh processing and the eighth processing for each ground contact link in the phase during which each of the plurality of the leg link mechanisms has the ground contact link in the travel motion of the mobile robot and to determine the new estimated values of the actual position and attitude of the first particular link by averaging the estimated values of the position and attitude of the first particular link calculated for each ground contact link by the forward kinematics arithmetic processing based on the corrected values of the current values of the desired position and attitude of each ground contact link and the observation value of the current displacement amount of each joint between the ground contact link and the first particular link or subjecting the values calculated by the averaging process to a low-pass characteristic filtering process in the sixth processing (a tenth aspect of the invention).

According to the ninth or the tenth aspect of the invention, in the phase during which each of the plurality of leg link mechanisms has the ground contact link, the new estimated value of the actual position of the first particular link is determined by averaging the estimated values of the actual position of the first particular link obtained for each ground contact link or by subjecting the value calculated by the averaging process to the low-pass characteristic filtering process. This arrangement makes it possible to achieve higher reliability or stability of the estimated value of the actual position of the first particular link, as compared with the case where the actual position of the first particular link is estimated by using the values of the desired position and attitude of any one ground contact link or the corrected values thereof (the values corrected on the basis of the estimated value of the elastic deformation amount) during the foregoing phase.

Further, carrying out the foregoing filtering process makes it possible to smoothly change the estimated value of the actual position of the first particular link.

DESCRIPTION OF THE PREFERRED EMBODIMENTS

First Embodiment

A first embodiment of the present invention will be described below with reference to FIG. 1 to FIG. 3.

Figure 1:
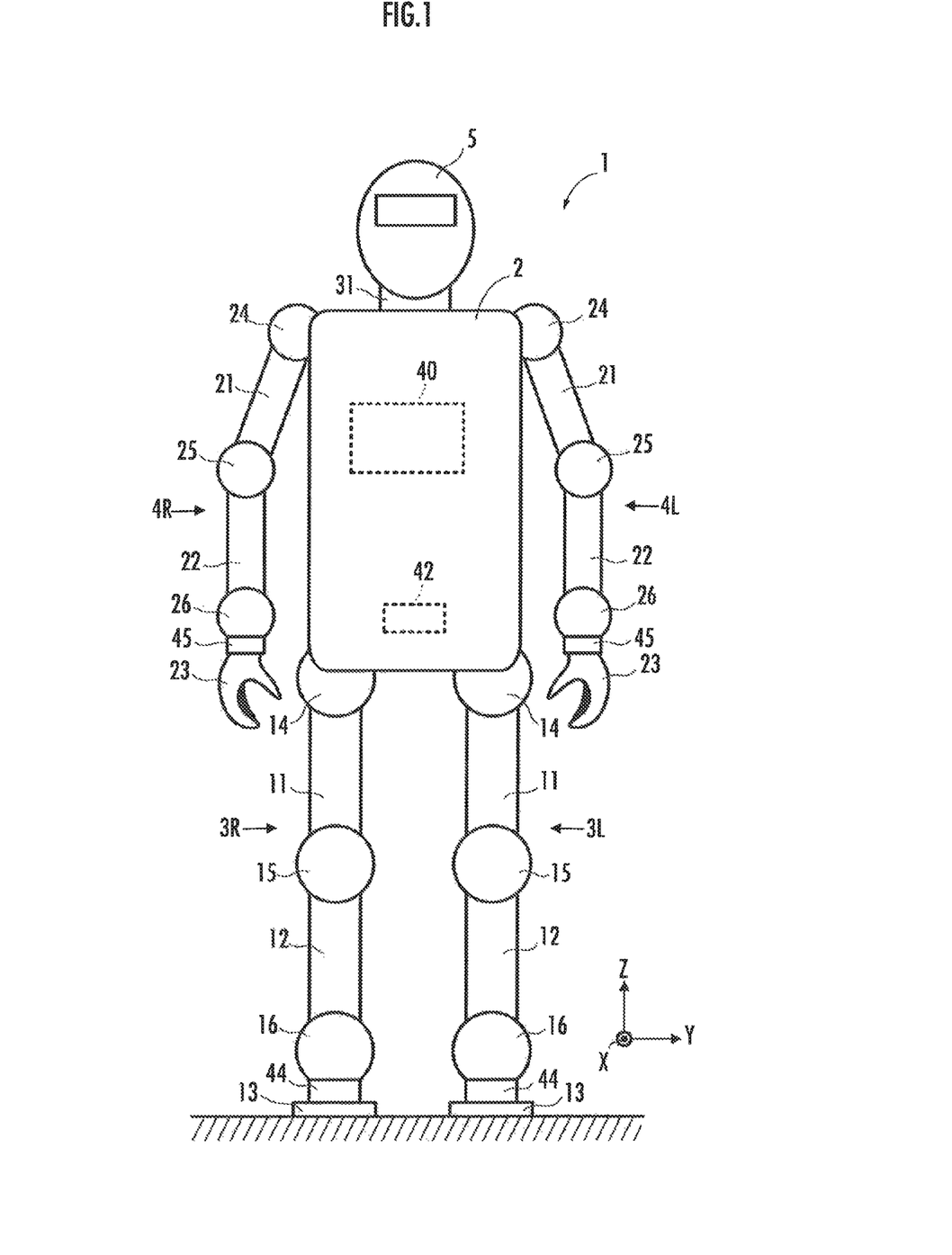
FIG. 1 is a diagram illustrating the configuration of a mobile robot according to an embodiment of the present invention.

FIG. 1 illustrates a humanoid robot, which is an example of a mobile robot 1 according to the present embodiment. The mobile robot 1 (hereinafter referred to simply as "the robot 1" in some cases) has a link 2 constituting the base body of the robot 1 (hereinafter referred to as "the base body 2"), a pair of left and right (two) leg link mechanisms 3L, 3R extended from a lower part of the base body 2, a pair of left and right (two) arm link mechanisms 4L, 4R extended from an upper part of the base body 2, and a link 5 constituting the head of the robot 1 (hereinafter referred to as "the head 5" in some cases).

In the description of the present embodiment, the reference characters L and R related to the leg link mechanisms 3L, 3R and the like denote the left side and the right side, respectively, as observed facing the front of the base body 2 of the robot 1. If, however, there is no need to distinguish between the left and the right, then the reference characters L and R will be omitted.

Each of the leg link mechanisms 3 is composed of three links 11, 12 and 13, which correspond to a thigh, a crus and a foot, respectively, which are connected through the intermediary of a hip joint mechanism part 14, a knee joint mechanism part 15, and an ankle joint mechanism part 16 in this order from the base body 2 side. Hereinafter, the links 11, 12 and 13 will be referred to as the thigh 11, the crus 12 and the foot 13, respectively, in some cases.

The joint mechanism parts 14, 15 and 16 of each of the leg link mechanisms 3 are configured such that the foot 13, which is the link of the distal end portion of the leg link mechanism 3, moves at, for example, six degrees of freedom of motion with respect to the base body 2.

For example, the hip joint mechanism part 14 is composed of three joints (not illustrated) so as to have a degree of freedom of rotation about a total of three axes, namely, a yaw axis, a pitch axis and a roll axis. The knee joint mechanism part 15 is composed of a single joint (not illustrated) so as to have a degree of freedom of rotation about a single axis, e.g., the pitch axis. The ankle joint mechanism part 16 is composed of two joints (not illustrated) so as to have a degree of freedom of rotation about a total of two axes, namely, for example, the pitch axis and the roll axis.

In the description of the present embodiment, unless otherwise specified, the term "joint" means a rotary joint that has a degree of freedom of rotation about a single axis. Such a joint is a structure composed of two members that can be relatively rotated about a single axis. The joint may adopt a publicly known structure.

Further, in the description of the present embodiment, the yaw axis, the pitch axis and the roll axis mean an axis in a vertical direction (Z-axis), an axis in a lateral direction (Y-axis), and an axis in a longitudinal direction (X-axis) of the robot 1 when the robot 1 is in an upright state (a state in which the base body 2, the leg link mechanisms 3 and the arm link mechanisms 4 are stretched in a substantially vertical direction), as illustrated in FIG. 1.

Each of the arm link mechanisms 4 is constituted by connecting three links 21, 22 and 23, which correspond to an upper arm, a forearm and a hand, respectively, through the intermediary of a shoulder joint mechanism part 24, an elbow joint mechanism part 25 and a wrist joint mechanism part 26 in this order from the base body 2 side. Hereinafter, the links 21, 22 and 23 will be referred to as the upper arm 21, the forearm 22 and the hand 23, respectively, in some cases.

As with the case of the leg link mechanisms 3, the joint mechanism parts 24, 25 and 26 of each of the arm link mechanisms 4 are configured such that the hand 23, which is the link of the distal end portion of the arm link mechanism 4, moves at, for example, six degrees of freedom of motion with respect to the base body 2.

For example, the shoulder joint mechanism part 24 is composed of three joints (not illustrated) so as to have a degree of freedom of rotation about a total of three axes, namely, the yaw axis, the pitch axis and the roll axis. The elbow joint mechanism part 25 is composed of a single joint (not illustrated) so as to have a degree of freedom of rotation about a single axis (e.g., the pitch axis or the roll axis). The wrist joint mechanism part 26 is composed of two joints (not illustrated) so as to have a degree of freedom of rotation about a total of two axes, namely, for example, the pitch axis and the roll axis.

The hands 23 may be provided with opening and closing mechanisms for performing a job by using the hands 23.

The head 5 is attached to the upper end of the base body 2 through the intermediary of a neck joint mechanism part 31. The neck joint mechanism part 31 is composed of one or two or three joints so as to have a degree of freedom of rotation about, for example, one axis, two axes or three axes.

The above has outlined the mechanical structure of the robot 1 according to the present embodiment. The robot 1 constructed as described above is capable of traveling basically by the motions of the left and right leg link mechanisms 3L, 3R (a two-leg gait motion, in which each of the feet 13 is repeatedly moved in the air and then landed on the ground).

Alternatively, it is also possible to have the robot 1 travel by moving the arm link mechanisms 4L, 4R as the leg link mechanisms that are separate from the leg link mechanisms 3L, 3R. For example, it is also possible to have the robot 1 travel by a four-leg gait motion, in which the links of the distal end portions (the feet 13 and the hands 23) of the four link mechanisms, namely, the leg link mechanisms 3L, 3R and the arm link mechanisms 4L, 4R, are repeatedly moved in the air and then landed on the ground. This travel motion enables the robot 1 to climb up and down a structure with a steep slope, such as a ladder or a stepladder.

Supplementarily, each of the leg link mechanisms 3 or each of the arm link mechanisms 4 may be configured to have a higher degree of motion freedom than, for example, six degrees of freedom.

Further, the base body 2 may be composed of two or more links connected through a joint or joints. For example, the base body 2 may be composed of two links, namely, an upper link and a lower link connected through a single joint or a plurality of joints.

Further, each of the leg link mechanisms 3 and each of the arm link mechanisms 4 may include linear motion type joints rather than being limited to the rotary type joints.

Further, the robot 1 may not have the head 5 and the neck joint mechanism part 31, or may not have one or both of the arm link mechanisms 4R, 4L.

Further, the robot 1 may have three or more leg link mechanisms. If the arm link mechanisms 4L, 4R are also operated as the leg link mechanisms in addition to the leg link mechanisms 3L, 3R to have the robot 1 travel, then the robot 1 can be regarded as a robot having substantially four leg link mechanisms.

A description will now be given of the configuration related to the control of the motion of the robot 1.

Figure 2:
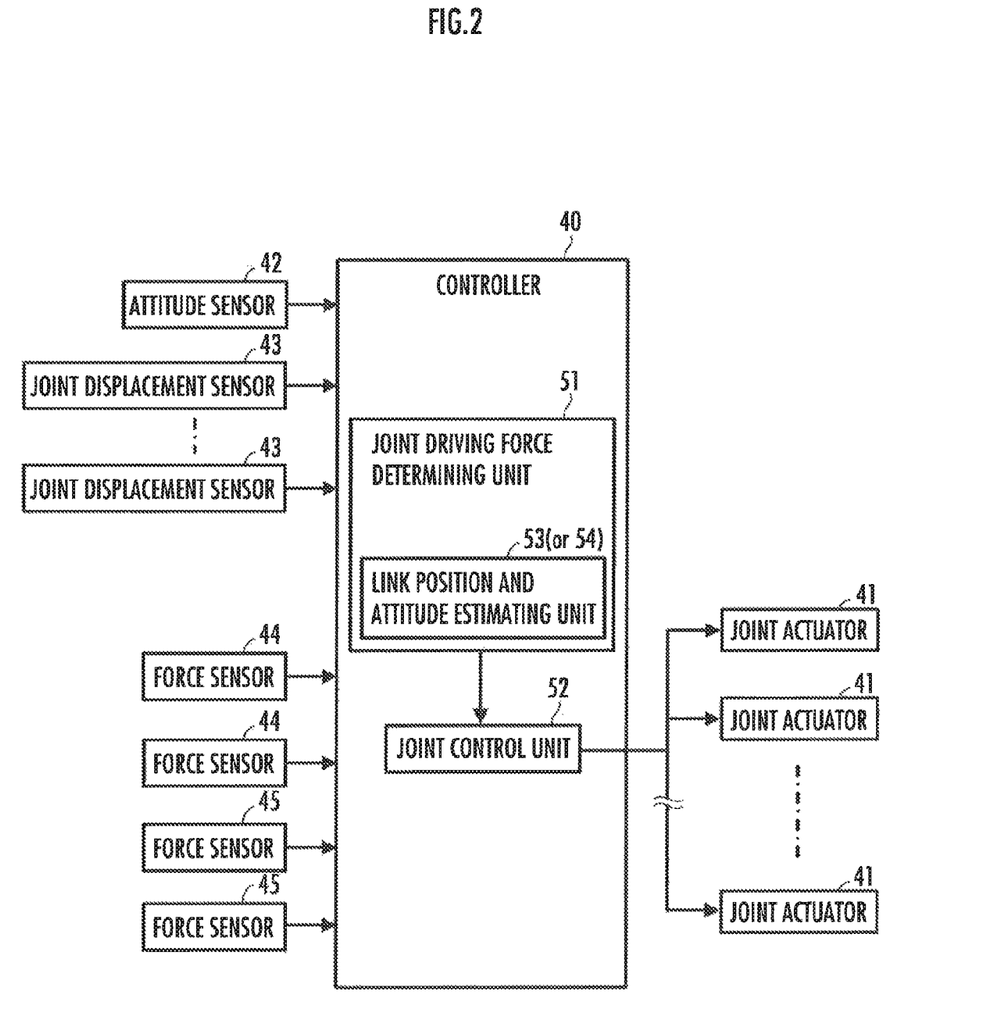
FIG. 2 is a block diagram illustrating a configuration related to the control of the motion of the mobile robot according to the embodiment.

As illustrated in FIG. 2, the robot 1 includes a controller 40 that controls the motion of the robot 1, joint actuators 41 that drive the individual joints, and various types of necessary sensors.

Each of the joint actuators 41 is provided for each joint. Each of the joint actuators 41 transmits a driving force to its corresponding joint through the intermediary of a reduction gear or the like (not illustrated) thereby to drive the joint. Each of the joint actuators 41 is composed of an electric motor in the present embodiment.

The robot 1 incorporates, as sensors, an attitude sensor 42 for detecting the attitude (the spatial orientation) of one link, e.g. the base body 2 of the robot 1, joint displacement sensors 43 for detecting the displacement amounts (the rotational angles) of the joints of the robot 1, force sensors 44 for detecting the external forces (translational forces and moments) received by the foot 13 of each of the leg link mechanisms 3 from an external object with which the foot 13 comes in contact, and force sensors 45 for detecting external forces (translational forces and moments) received by the hand 23 of each of the arm link mechanisms 4 from an external object with which the hand 23 comes in contact.

The attitude sensor 42 is a sensor installed to the base body 2 (refer to FIG. 1) such that the attitude of the base body 2 and the temporal change rate (angular velocity) thereof can be detected by, for example, a strapdown method. The attitude sensor 42 is comprised of a gyro sensor, which detects three-axis angular velocities, and an acceleration sensor, which detects three-axis translational accelerations.

Each of the joint displacement sensors 43 is provided for each joint. Each of the joint displacement sensors 43 is comprised of a rotational angle sensor, such as a rotary encoder or a potentiometer.

Each of the force sensors 44 is provided for each of the leg link mechanisms 3. Each of the force sensors 44 is comprised of, for example, a six-axis force sensor interposed between the ankle joint mechanism part 16 and the foot 13 of each of the leg link mechanisms 3, as illustrated in FIG. 1. Further, each of the force sensors 45 is provided for each of the arm link mechanisms 4. Each of the force sensors 45 is comprised of, for example, a six-axis force sensor interposed between the wrist joint mechanism part 26 and the hand 23 of each of the arm link mechanisms 4, as illustrated in FIG. 1.

The robot 1 may be provided with sensors (e.g. sensors for recognizing an external environment) other than the sensors described above. For example, the base body 2 or the head 5 may be provided with a camera or a distance measurement sensor or the like.

The controller 40 is constituted of an electronic circuit unit, which includes a CPU, a RAM, a ROM, an interface circuit and the like, and receives the detection signals from the foregoing sensors. The controller 40 may alternatively be composed of a plurality of electronic circuit units capable of communicating with each other.

The controller 40 has a joint driving force determining unit 51, which sequentially determines, at a predetermined control processing cycle, the desired driving force for each of the joints (the desired value of the driving force to be imparted to each joint from the joint actuator 41 corresponding to the joint), and a joint control unit 52, which controls the joint actuator 41 according to the desired driving force. These functions are implemented by executing installed programs (functions implemented by a software configuration) or implemented by a hardware configuration.

Further, the joint driving force determining unit 51 includes a link position and attitude estimating unit 53, which estimates the actual position and attitude of a predetermined link of the robot 1. A reference numeral 54, which is parenthesized, relates to a second embodiment to be discussed later.

Supplementarily, in the present embodiment, the joint driving force control unit in the present invention is implemented by the joint driving force determining unit 51 and the joint control unit 52. Further, the link position and attitude estimating unit 53 corresponds to the link position and attitude estimating unit in the present invention.

The control processing by the controller 40 will now be described in more detail. The following description will be focused mainly on an example in which the robot 1 travels by the motions of the leg link mechanisms 3L, 3R, i.e. the two-leg gait motion. This travel motion is a motion in which the feet 13, which are the links of the distal end portions of the leg link mechanisms 3, are repeatedly moved in the air and then landed on the ground thereby to have the robot 1 travel in a manner similar to that of the walking motion of a human.

The controller 40 generates a reference desired motion for the travel motion of the robot 1 according to a motion command for the robot 1 supplied from an external server or the like or a travel plan or the like taught in advance. The motion of each link of the robot 1 or the displacement amount of each joint can be specified by the reference desired motion. The reference desired motion is composed of, for example, the trajectory of the desired position and attitude of the foot 13 of each of the leg link mechanisms 3, the trajectory of the desired position and attitude of the base body 2, the trajectory of the relative desired position and attitude of the hand 23 of each of the arm link mechanisms 4 with respect to the base body 2, and the trajectory of the relative desired attitude of the head 5 with respect to the base body 2. Alternatively, the reference desired motion is composed of parameters that specify the foregoing trajectories.

In the present embodiment, the term "the desired position and attitude" of any portion (link) of the robot 1, such as the foot 13, means a set of the desired value of the position of the portion (specifically the position of a predetermined representative point of the portion) and the desired value of the attitude (spatial orientation) of the portion. The term "trajectory" means the time series of instantaneous values.

Further, the desired position and attitude of the foot 13 and the desired position and attitude of the base body 2 in the reference desired motion are expressed as the positions and the attitudes observed in a global coordinate system (world coordinate system) arbitrarily set relative to an external world. These desired positions and attitudes are generated such that, for example, the dynamic constraint condition related to a zero moment point (ZMP) or the like (the constraint condition such as the presence of a ZMP in a so-called support polygon), a mechanical constraint condition, such as the movable range of each joint of each of the leg link mechanisms 3, and a requirement, such as the travel path, the travel speed and the like of the robot 1 can be satisfied. The generation method may be a publicly known method.

Further, the desired positions and attitudes of the hands 23 are expressed as the positions and the attitudes observed in a local coordinate system set relative to the base body 2. The desired attitude of the head 5 is expressed as an attitude observed in the local coordinate system. The relative desired positions and attitudes of the hands 23 and the desired attitude of the head 5 relative to the base body 2 can be respectively generated, for example, to be maintained constant. Alternatively, however, the desired positions and attitudes of the hands 23 or the desired attitude of the head 5 may be generated such that the hands 23 or the head 5 moves relative to the base body 2 when the robot 1 travels.

Supplementarily, it is also possible to generate all or some of the reference desired motions at an external server, and to transfer the reference desired motions from the server to the controller 40 of the robot 1 by wireless communication. In this case, the processing of generating all or some of the reference desired motions, which is carried out in the controller 40, is unnecessary.

The controller 40 then carries out the processing in the joint driving force determining unit 51 on the basis of the reference desired motions, thereby sequentially determining the desired driving forces for the joints of the robot 1 at a predetermined control processing cycle.

In this case, the joint driving force determining unit 51 first calculates the reference desired driving force for each joint of the robot 1 from the foregoing reference desired motion by using the inverse kinematics model of the robot 1 (by the force control method).

If the robot 1 is expected to travel by the two-leg gait motion, then the desired driving force for each joint of each of the arm link mechanisms 4 and the desired driving force for each joint of the neck joint mechanism part 31 may be determined by, for example, a position control method. More specifically, the desired displacement amount of each joint of each of the arm link mechanisms 4 may be determined by the inverse kinematics arithmetic processing according to the relative desired position and attitude of each of the hands 23 with respect to the base body 2, and the desired driving force for the joint may be determined such that the actual displacement amount (the observation value) of each joint of each of the arm link mechanisms 4 agrees with the desired displacement amount. The same applies to each joint of the neck joint mechanism part 31.

Subsequently, the joint driving force determining unit 51 revises, as necessary, the reference desired driving force for each joint so as to determine the desired driving force for each joint used for the actual control of each of the joint actuators 41.

In this case, according to the present embodiment, the joint driving force determining unit 51 carries out the processing in the link position and attitude estimating unit 53 in order to determine the manipulated variable for revising the reference desired driving force for each joint of each of the leg link mechanisms 3.

In the present embodiment, the link position and attitude estimating unit 53 estimates the actual position and attitude (the position and the attitude observed in the global coordinate system) of the base body 2 and the actual position and attitude (the position and the attitude observed in the global coordinate system) of the foot 13 not in contact with the ground (the foot 13 that moves in the air) among the feet 13, 13 of the leg link mechanisms 3L, 3R.

In this case, the base body 2 and the foot 13 not in contact with the ground (hereinafter referred to as "the not-in-contact-with-ground foot 13") correspond to the first particular link and the second particular link, respectively, in the present invention. Further, the foot 13 in contact with the ground (hereinafter referred to as "the in-contact-with-ground foot 13") corresponds to the ground contact link in the present invention.

When the robot 1 travels in the two-leg gait motion, the state of a double stance phase, which is a phase during which both feet 13, 13 of the leg link mechanisms 3L, 3R become the in-contact-with-ground feet 13, 13 and the state of a single stance phase, which is a phase during which the foot 13 of only one of the leg link mechanisms 3L, 3R becomes the in-contact-with-ground foot 13, are alternately switched.

The specific processing carried out by the link position and attitude estimating unit 53 will be described in detail with reference to FIG. 3. In the following description, Xb, Qb, Xsup, Qsup, Xswg, Qswg, θi (i denoting the identification character of each joint), and Fc with appropriate suffixes (_ref, _act and the like) will be used as the reference characters that denote the position and the attitude of the base body 2, the position and the attitude of the in-contact-with-ground foot 13, the position and the attitude of the not-in-contact-with-ground foot 13, the displacement amount of each joint, and the load (the translational force and the moment) acting on the in-contact-with-ground foot 13, respectively.

At each control processing cycle, the link position and attitude estimating unit 53 acquires, as the input parameters, a desired position Xsup_ref of each of the in-contact-with-ground feet 13, an observation value Qb_act of the actual current attitude of the base body 2, an observation value θi_act of the actual current displacement amount of each joint of each of the leg link mechanisms 3, and an observation value Fc_act of the actual current load acting on each of the in-contact-with-ground feet 13.

In this case, the desired position Xsup_ref of each of the in-contact-with-ground feet 13 acquired by the link position and attitude estimating unit 53 is the desired position (an instantaneous value) of the in-contact-with-ground foot 13 at the time of a current control processing cycle in the reference desired motion. Further, the observation value Qb_act of the actual current attitude of the base body 2 is a latest value calculated by the arithmetic processing based on the strap-down method by using a detection signal of the attitude sensor 42 at a current control processing cycle. Further, the observation value θi_act of the actual current displacement amount of each joint of each of the leg link mechanisms 3 is a latest value indicated by a detection signal of the joint displacement sensor 43 at a current control processing cycle. Further, the observation value Fc_act of the actual current load acting on each of the in-contact-with-ground feet 13 is a latest value indicated by a detection signal of the force sensor 44 corresponding to the in-contact-with-ground foot 13.

Figure 3:
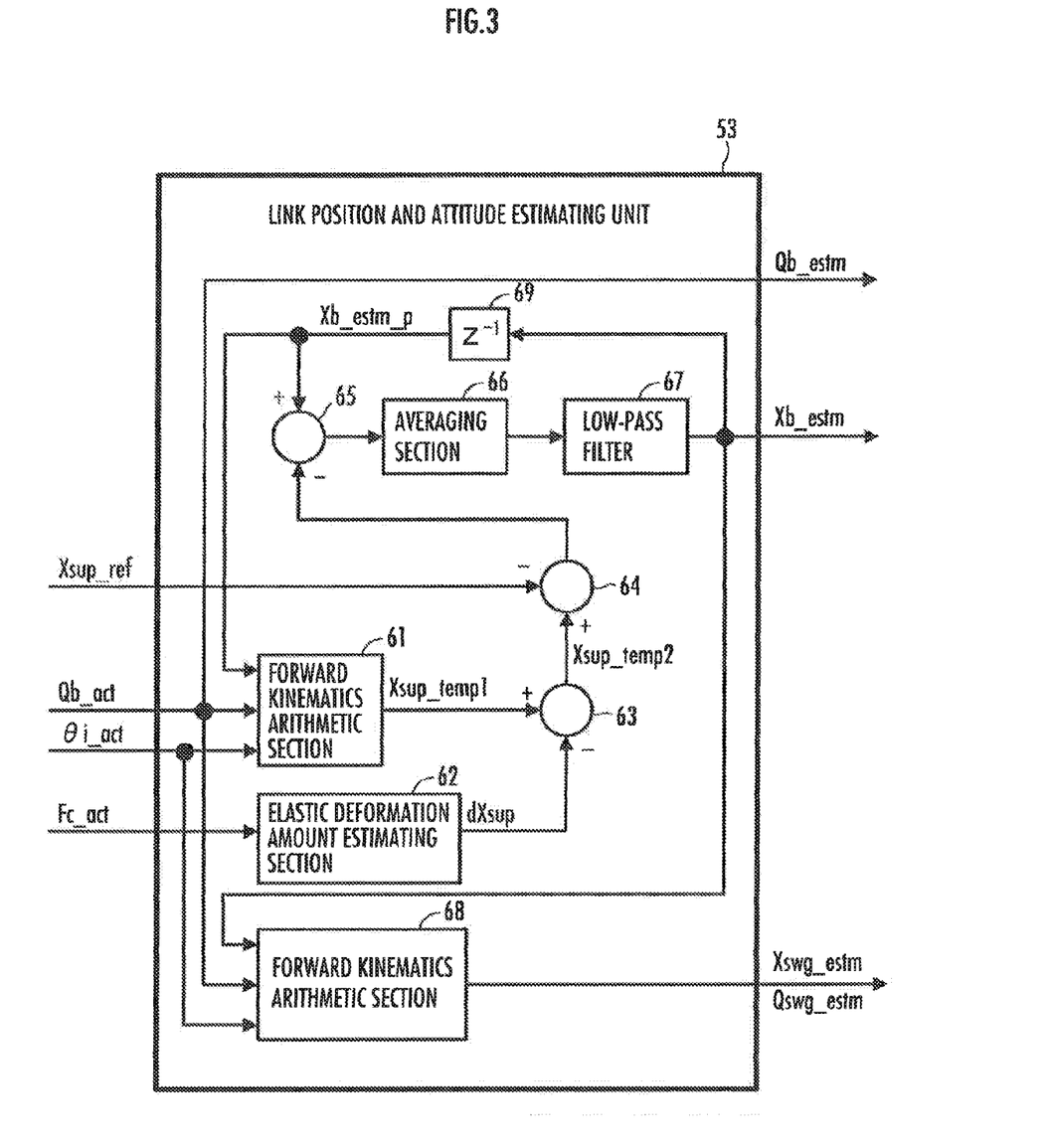
FIG. 3 is a block diagram illustrating the processing by a link position and attitude estimating unit, which is illustrated in FIG. 2, in a first embodiment.

Then, the link position and attitude estimating unit 53 carries out the processing in a forward kinematics arithmetic section 61 and an elastic deformation amount estimating section 62 illustrated in FIG. 3.

In the processing by the forward kinematics arithmetic section 61, the link position and attitude estimating unit 53 calculates a temporary value Xsup_temp1 of the position of the in-contact-with-ground foot 13 of each of the leg link mechanisms 3 in contact with the ground by the forward kinematics arithmetic processing on the basis of an estimated value Xb_estm_p of the position of the base body 2 determined at a last control processing cycle (i.e. a previous value), the observation value Qb_act (a current value) of the actual attitude of the base body 2, and the observation value θi_act (a current value) of the actual displacement amount of each joint of the leg link mechanism 3 that has the in-contact-with-ground foot 13 among the joints of the robot 1 (hereinafter referred to as "the in-contact-with-ground leg link mechanism 3").

The temporary value Xsup_temp 1 is a value calculated by the forward kinematics arithmetic processing (geometric arithmetic processing), assuming or regarding that the position and the attitude of the base body 2 and the displacement amount of each joint of each of the in-contact-with-ground leg link mechanisms 3 agree with Xb_estm_p (a previous value), Qb_act (a current value), and θi_act (a current value), respectively.

In the double stance phase, during which the feet 13, 13 of the two leg link mechanisms 3L, 3R are in contact with the ground, the Xsup_temp 1 is calculated for each of the two in-contact-with-ground feet 13, 13. In the single stance phase, during which only the foot 13 of either the leg link mechanism 3L or 3R is in contact with the ground, the Xsup_temp1 is calculated only for the in-contact-with-ground foot 13.

Supplementarily, the estimated value Xb_estm_p (a previous value) of the position of the base body 2 means the latest value among the estimated values Xb_estm determined in the past by the link position and attitude estimating unit 53 (i.e. before the current control processing cycle). Further, the observation value θi_act of the actual displacement amount of each joint of the in-contact-with-ground leg link mechanism 3 that has the in-contact-with-ground foot 13 is, in other words, the observation value of the actual displacement amount of each joint between the base body 2 (the first particular link) and the in-contact-with-ground foot 13 (the in-contact-with-ground link).

In the processing by the elastic deformation amount estimating section 62, the link position and attitude estimating unit 53 calculates an estimated value of an elastic deformation amount dXsup related to the position of the in-contact-with-ground foot 13 on the basis of the observation value Fc_act of the load acting on the in-contact-with-ground foot 13 by using a stiffness coefficient, i.e. the so-called spring constant, set beforehand for the in-contact-with-ground foot 13.

Each of the feet 13 generally exhibits a certain degree of elasticity, thus developing elastic deformation attributable to the load applied at the time of its contact with the ground. The elastic deformation causes the position or the attitude of the representative point of the foot 13 (the in-contact-with-ground foot 13) to slightly change from the state in which the foot 13 does not have the elastic deformation. The processing by the elastic deformation amount estimating section 62 calculates, as the estimated value of the elastic deformation amount dXsup, the estimated value of the change amount of the position of the in-contact-with-ground foot 13 caused by the elastic deformation of the in-contact-with-ground foot 13.

In the double stance phase, dXsup is calculated for each of the two in-contact-with-ground feet 13, 13. In the single stance phase, dXsup is calculated only for an appropriate one of the in-contact-with-ground feet 13.

Then, the link position and attitude estimating unit 53 sequentially carries out the processing in arithmetic sections 63, 64 and 65.

In the processing carried out in the arithmetic section 63, the link position and attitude estimating unit 53 corrects the temporary value Xsup_temp 1 of the position of the in-contact-with-ground foot 13 calculated in the forward kinematics arithmetic section 61 on the basis of the estimated value of the elastic deformation amount dXsup calculated for the in-contact-with-ground foot 13 by the elastic deformation amount estimating section 62 (more specifically by subtracting dXsup from Xsup_temp1), thereby calculating a corrected temporary value Xsup_temp2.

The corrected temporary value Xsup_temp2 indicates the position of the in-contact-with-ground foot 13 in the case where it is assumed that the amount of a change in the position of the in-contact-with-ground foot 13 attributable to the elastic deformation of the in-contact-with-ground foot 13 (the amount of the change from the temporary value Xsup_temp1 of the position of the in-contact-with-ground foot 13 calculated by the forward kinematics arithmetic section 61) agrees with the elastic deformation amount dXsup calculated by the elastic deformation amount estimating section 62.

Hence, if the actual position of the base body 2 agrees with the estimated value Xb_estm_p (a previous value), then the corrected temporary value Xsup_temp2 corresponds to the actual position of the in-contact-with-ground foot 13.

Subsequently, the link position and attitude estimating unit 53 carries out, in the arithmetic section 64, the processing of calculating, for each of the in-contact-with-ground feet 13, the difference between the corrected temporary value Xsup_temp2 and the desired position Xsup_ref of the in-contact-with-ground foot 13 in the reference desired motion (=Xsup_temp2−Xsup_ref).

The actual position of each of the in-contact-with-ground feet 13 constrained relative to an external object by its contact with the ground can be generally regarded to have a relatively high degree of agreement with the desired position Xsup_ref. Therefore, the difference (=Xsup_temp2−Xsup_ref) can be regarded to correspond to the amount of discrepancy (difference) between the estimated value Xb_estm_p (the previous value) of the position of the base body 2 used for the processing by the forward kinematics arithmetic section 61 and the actual current position of the base body 2.

Hence, the link position and attitude estimating unit 53 then carries out, in the arithmetic section 65, the processing of correcting the estimated value Xb_estm_p (the previous value) of the position of the base body 2 on the basis of the difference for each of the in-contact-with-ground feet 13 calculated in the arithmetic section 64 (specifically, by subtracting the difference from Xb_estm_p for each of the in-contact-with-ground feet 13).

Subsequently, the link position and attitude estimating unit 53 subjects the value calculated in the arithmetic section 65 to the processing in an averaging section 66. The averaging section 66 determines the mean value (the addition mean value) of the values calculated in the arithmetic section 65 on each of the two in-contact-with-ground feet 13, 13 in the double stance phase. Further, in the single stance phase, the averaging section 66 directly outputs the value on the one in-contact-with-ground foot 13 calculated by the arithmetic section 65.

Then, the link position and attitude estimating unit 53 subjects the output value obtained by the processing in the averaging section 66 to the low-pass characteristic filtering through a low-pass filter 67 thereby to determine the estimated value Xb_estm of the actual current position of the base body 2 and outputs the determined estimated value Xb_estm.

Further, the link position and attitude estimating unit 53 directly outputs the observation value Qb_act (the current value) of the actual attitude of the base body 2 as the estimated value Qb_estm of the actual current position of the base body 2.

Further, the link position and attitude estimating unit 53 carries out the processing in a forward kinematics arithmetic section 68, which is separate from the forward kinematics arithmetic section 61, in the single stance phase. In the processing in the forward kinematics arithmetic section 68, the link position and attitude estimating unit 53 calculates estimated values Xswg_estm and Qswg_estm of the actual current position and the actual current attitude, respectively, of the foot 13 of the not-in-contact-with-ground leg link mechanism 3 (the not-in-contact-with-ground foot 13) by carrying out the forward kinematics arithmetic processing on the basis of the estimated value Xb_estm of the actual current position of the base body 2, the observation value Qb_act (the current value) of the actual attitude of the base body 2, and the observation value θi_act (the current value) of the actual displacement amount of each joint of the leg link mechanism 3 having the not-in-contact-with-ground foot 13 (hereinafter referred to as "the not-in-contact-with-ground leg link mechanism 3) among the joints of the robot 1, which values have been determined as described above, and outputs the calculated estimated values Xswg_estm and Qswg_estm.

Supplementarily, the observation value θi_act of the actual displacement amount of each joint of the not-in-contact-with-ground leg link mechanism 3 is, in other words, the observation value of the actual displacement amount of each joint between the base body 2 (the first particular link) and the not-in-contact-with-ground foot 13 (the second particular link).

In FIG. 3, reference numeral 69 denotes a delay element expressed in the form of Z transform.

The link position and attitude estimating unit 53 in the present embodiment carries out the processing described above to sequentially determine, at a predetermined control processing cycle, the estimated values Xb_estm and Qb_estm of the actual position and the actual attitude, respectively, of the base body 2 and the estimated values Xswg_estm and Qswg_estm of the actual position and the actual attitude, respectively, of the not-in-contact-with-ground foot 13 (the foot 13 moving in the air) in the single stance phase.

Supplementarily, the processing in the forward kinematics arithmetic section 61, the processing in the elastic deformation amount estimating section 62, and the processing in the arithmetic section 63 in the present embodiment correspond to the first processing, the third processing, and the fourth processing, respectively, in the present invention. Further, the processing in the arithmetic section 65, the averaging section 66, and the low-pass filter 67 in the present embodiment corresponds to the second processing in the present invention.

The joint driving force determining unit 51 determines the manipulated variable for revising the reference desired driving force for each joint of each of the leg link mechanisms 3 by using the estimated values Xb_estm, Qb_estm, Xswg_estm, and Qswg_estm determined as described above.

For example, the joint driving force determining unit 51 calculates the differences (the difference in position and the difference in attitude) between the estimated values Xb_estm and Qb_estm of the actual position and attitude of the base body 2 and the desired position Xb_ref and the desired attitude Qb_ref in the reference desired motion, and the differences (the difference in position and the difference in attitude) between the estimated values Xswg_estm and Qswg_estm of the actual position and attitude of the not-in-contact-with-ground foot 13 and the desired position Xswg_ref and the desired attitude Qswg_ref in the reference desired motion. Then, based on the differences, the joint driving force determining unit 51 determines the manipulated variable for revising the reference desired driving force (the desired driving force at the current control processing cycle) of each joint of each of the leg link mechanisms 3 according to a feedback control rule or the like so as to reduce each of the differences (i.e. to bring the differences close to zero). Further, at each control processing cycle, the joint driving force determining unit 51 revises the reference desired driving force for each joint of each of the leg link mechanisms 3 on the basis of the manipulated variable determined as described above, thereby determining the desired driving force for each of the leg link mechanisms 3.

Thus, the desired driving force for each joint of each of the leg link mechanisms 3 is adjusted such that the difference in position and the difference in attitude in the base body 2 and the not-in-contact-with-ground foot 13 can be reduced.

The manipulated variable can be determined also as described below. The estimated values of the translational velocity and the angular velocity of each of the base body 2 and the not-in-contact-with-ground foot 13 are further calculated by carrying out the differential operation (the operation for calculating a temporal change rate) or the like on the estimated values Xb_estm, Qb_estm, Xswg_estm, and Qswg_estm. Then, the manipulated variable is determined such that, in addition to the difference in position and the difference in attitude described above, the differences between the estimated values of the translational velocities and the angular velocities of the base body 2 and the not-in-contact-with-ground foot 13 and the desired translational velocities and the desired angular velocities (the difference in translational velocity and the difference in angular velocity) in the reference desired motion are also reduced.

Further, according to the present embodiment, when the robot 1 travels in the two-leg gait motion, the joint driving force determining unit 51 determines the desired driving force for each joint of each of the arm link mechanisms 4 and the desired driving force for each joint of the neck joint mechanism part 31 such that these desired driving forces agree with the reference desired driving forces.

The controller 40 carries out the processing in the joint control unit 52 after determining the desired driving force for each joint of the robot 1 by the joint driving force determining unit 51 as described above at each control processing cycle.

The joint control unit 52 determines the desired value of an output torque of the joint actuator 41 for causing the driving force to be imparted to each joint from the joint actuator 41 to agree with the desired driving force. Then, the joint control unit 52 controls the energizing current of the electric motor, which serves as the joint actuator 41, according to the determined desired value of the output torque.

Thus, the joint actuator 41 corresponding to the joint is controlled such that a driving force that agrees with the desired driving force is imparted to each joint.

The above has described in detail the processing carried out by the controller 40 in the present embodiment.

According to the present embodiment, the link position and attitude estimating unit 53 acquires, at each control processing cycle, the desired position Xsup_ref of each of the in-contact-with-ground feet 13, the observation value Qb_act of the actual attitude of the base body 2, the observation value θi_act of the actual displacement amount of each joint of each of the leg link mechanisms 3, and the observation value Fc_act of the load acting on each of the in-contact-with-ground feet 13 as the input parameters. Then, the link position and attitude estimating unit 53 determines the estimated values Xb_estm, Qb_estm, Xswg_estm, and Qswg_estm of the actual positions and attitudes of the base body 2 and the not-in-contact-with-ground foot 13 on the basis of the input parameters by carrying out the processing described above.

In this case, the observation value Qb_act of the actual attitude of the base body 2 and the observation value θi_act of the actual displacement amount of each joint of each of the leg link mechanisms 3 can be obtained with relatively high accuracy from the detection signals of the attitude sensor 42 and the joint displacement sensor 43, respectively. Hence, the estimated values Qb_estm and Qswg_estm of the attitudes of the base body 2 and the not-in-contact-with-ground foot 13, respectively, can be determined with high reliability.

Further, the processing of estimating the actual position of the base body 2 is carried out on the assumption that the desired position Xsup_ref of each of the in-contact-with-ground feet 13 constrained relative to an external object by its contact with the ground agrees with the actual position thereof.

In this case, the differences (the difference in position and the difference in attitude) between the estimated values Xswg_estm and Qswg_estm of the position and attitude of the not-in-contact-with-ground foot 13 and the desired position and attitude Xswg_ref and Qswg_ref are reflected in the adjustment of the desired driving force for each joint of each of the leg link mechanisms 3. This makes it possible to enhance the agreement between the actual position and attitude and the desired position and attitude Xsup_ref and Qsup_ref of the in-contact-with-ground foot 13 in a state in which the not-in-contact-with-ground foot 13 comes in contact with the ground and becomes the in-contact-with-ground foot 13.

Further, the elastic deformation amount dXsup of the in-contact-with-ground foot 13 calculated on the basis of the observation value Fc_act of the load acting on each of the in-contact-with-ground feet 13 is reflected in the estimated value Xb_estm of the position of the base body 2. This makes it possible to properly compensate for the influence of the elastic deformation of the in-contact-with-ground foot 13.

Further, in the double stance phase, in which the two leg link mechanisms 3L, 3R have the in-contact-with-ground links 13, the positions of the base body 2 calculated for each of the in-contact-with-ground links 13 are averaged.

Thus, the estimated values Xb_estm and Xswg_estm of the actual positions of the base body 2 and the not-in-contact-with-ground foot 13 can be determined with high reliability.

As described above, the link position and attitude estimating unit 53 is capable of sequentially determining the highly reliable estimated values Xb_estm, Qb_estm, Xswg_estm, and Qswg_estm by simple processing without the need for complicated arithmetic processing.

As a result, each joint of each of the leg link mechanisms 3 is controlled by the force control method, making it possible to properly prevent the actual motion of the robot 1 from deviating from a reference desired motion due to a change in an external force or the like acting on the robot 1.

Supplementarily, the description of the present embodiment given above has been focused mainly on the example in which the robot 1 travels in the two-leg gait motion. However, also in the case of, for example, a four-leg gait travel motion, in which the arm link mechanisms 4L, 4R are moved also as the leg link mechanisms in addition to the leg link mechanisms 3L, 3R, the same processing as the processing by the link position and attitude estimating unit 53 described above can be carried out to determine the estimated values of the positions and the attitudes of the base body 2, each of the not-in-contact-with-ground feet 13, and each of the hands 23 not in contact with the ground.

In this case, the hands 23 in contact with the ground and the in-contact-with-ground foot 13 correspond to the ground contact links in the present invention. Further, the hands 23 not in contact with the ground and the not-in-contact-with-ground foot 13 correspond to the second particular links in the present invention.

In this case, the reference desired driving force for each joint of each of the leg link mechanisms 3L, 3R and the arm link mechanisms 4L, 4R is determined on the basis of the reference desired motion by using the inverse kinematics model. Then, the reference desired driving force for each joint of each of the leg link mechanisms 3L, 3R and the arm link mechanisms 4L, 4R is revised on the basis of the manipulated variable determined according to, for example, the differences (the difference in position and the difference in attitude) between the estimated values of the positions and the attitudes of the base body 2 and each of the feet 13 and the hands 23 not in contact with the ground and the desired values thereof. Alternatively, the reference desired driving force for each joint of each of the leg link mechanisms 3L, 3R and the arm link mechanisms 4L, 4R is revised on the basis of the manipulated variable determined according to, for example, the difference in position and the difference in attitude described above, and the difference in translational velocity and the difference in angular velocity of the base body 2 and each of the feet 13 and the hands 23 not in contact with the ground.

Second Embodiment

A second embodiment of the present invention will be described with reference to FIG. 4. The present embodiment differs from the first embodiment only in the processing carried out by a link position and attitude estimating unit. Hence, the description of the same aspects as those of the first embodiment will be omitted.

A controller 40 in the present embodiment has a link position and attitude estimating unit 54, which is denoted by the parenthesized reference numeral 54 in FIG. 2, in place of the link position and attitude estimating unit 53 described in the first embodiment.

Figure 4:
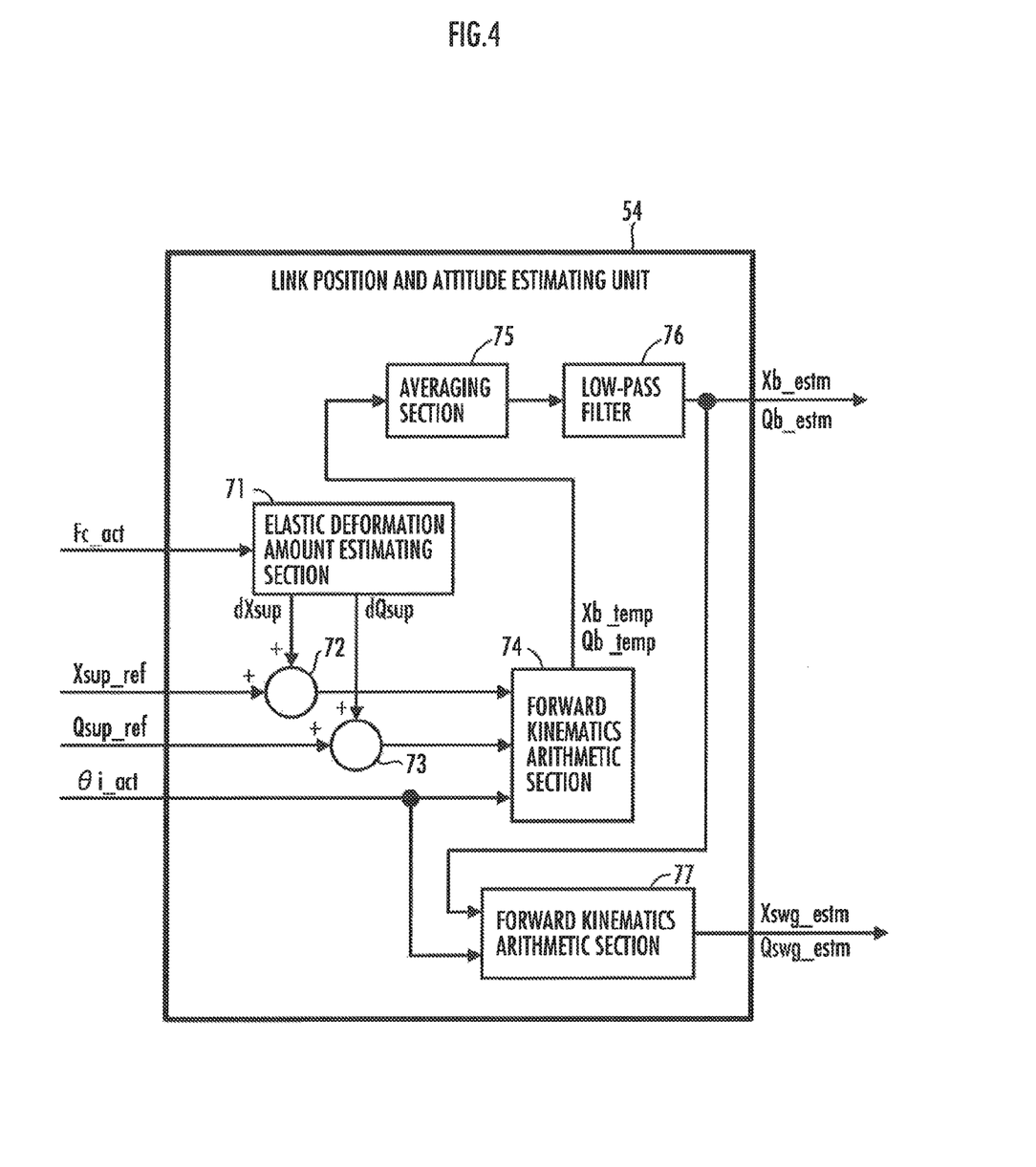
FIG. 4 is a block diagram illustrating the processing by a link position and attitude estimating unit, which is illustrated in FIG. 2, in a second embodiment.

Referring to FIG. 4, the processing carried out by the link position and attitude estimating unit 54 in the present embodiment will be described. As with the first embodiment, the description of the present embodiment will be focused mainly on an example in which a robot 1 travels in the two-leg gait motion.

The link position and attitude estimating unit 54 in the present embodiment acquires a desired position Xsup_ref and a desired attitude Qsup_ref of each of in-contact-with-ground feet 13, an observation value θi_act of the actual current displacement amount of each joint of each of leg link mechanisms 3, and an observation value Fc_act of the actual current load acting on each of the in-contact-with-ground feet 13 as input parameters at each control processing cycle.

In this case, the desired position Xsup_ref of each of the in-contact-with-ground feet 13, the observation value θi_act of the actual current displacement amount of each joint of each of the leg link mechanisms 3, and the observation value Fc_act of the actual current load acting on each of the in-contact-with-ground feet 13 are the same as those acquired by the link position and attitude estimating unit 53 in the first embodiment.

Further, the desired attitude Qsup_ref of each of the in-contact-with-ground feet 13 is the desired attitude (an instantaneous value) of the in-contact-with-ground foot 13 at the time of a current control processing cycle in the reference desired motion.

Then, the link position and attitude estimating unit 54 carries out the processing in an elastic deformation amount estimating section 71 illustrated in FIG. 4.

In the processing in the elastic deformation amount estimating section 71, based on the observation value Fc_act of the load acting on each of the in-contact-with-ground feet 13, the link position and attitude estimating unit 54 calculates the estimated value of an elastic deformation amount dXsup related to the position of the in-contact-with-ground foot 13 (the change amount of the position of the in-contact-with-ground foot 13 caused by an elastic deformation) and the estimated value of the elastic deformation amount dQsup related to the attitude thereof (the change amount of the attitude of the in-contact-with-ground foot 13 caused by the elastic deformation) by using a stiffness coefficient (spring constant) set in advance for the in-contact-with-ground foot 13.

The link position and attitude estimating unit 54 subsequently carries out the processing in arithmetic sections 72 and 73. In the processing in the arithmetic section 72, the link position and attitude estimating unit 54 corrects the desired position of each of the in-contact-with-ground feet 13 in the reference desired motion on the basis of the estimated value of the elastic deformation amount dXsup calculated for the in-contact-with-ground foot 13 in the elastic deformation amount estimating section 71 (specifically, dXsup is added to Xsup_ref).

Further, in the processing carried out in the arithmetic section 73, the link position and attitude estimating unit 54 corrects the desired attitude of each of the in-contact-with-ground feet 13 in the reference desired motion on the basis of the estimated value of the elastic deformation amount dQsup calculated for the in-contact-with-ground foot 13 in the elastic deformation amount estimating section 71 (specifically, dQsup is added to Qsup_ref).

The actual position and attitude of each of the in-contact-with-ground feet 13 constrained relative to an external object by its contact with the ground can be regarded to exhibit a relatively high degree of agreement with the desired position Xsup_ref and the desired attitude Qsup_ref, respectively.

Hence, the processing in the arithmetic sections 72 and 73 calculates the position and the attitude by correcting the actual position and attitude of each of the in-contact-with-ground feet 13 by the elastic deformation amounts dXsup and dQsup of the in-contact-with-ground foot 13 (the position and the attitude obtained in the case where it is assumed that the in-contact-with-ground foot 13 is free of the elastic deformation).

The processing in the elastic deformation amount estimating section 71 and the arithmetic sections 72, 73 is carried out on each of the two in-contact-with-ground feet 13, 13 in the double stance phase of the robot 1. Meanwhile, the processing in the elastic deformation amount estimating section 71 and the arithmetic sections 72, 73 is carried out only on one of the in-contact-with-ground feet 13 in the single stance phase of the robot 1.

Then, the link position and attitude estimating unit 54 carries out the processing in a forward kinematics arithmetic section 74. In the processing carried out in the forward kinematics arithmetic section 74, the link position and attitude estimating unit 54 calculates temporary estimated values Xb_temp and Qb_temp of the position and the attitude of the base body 2 by the forward kinematics arithmetic processing on the basis of the corrected desired position and the corrected desired attitude of each of the in-contact-with-ground feet 13 obtained in the arithmetic sections 72, 73 and an observation value θi_act (a current value) of the actual displacement amount of each joint of an in-contact-with-ground leg link mechanism 3 having the in-contact-with-ground foot 13.

The observation value θi_act of the actual displacement amount of each joint of the in-contact-with-ground leg link mechanism 3 having the in-contact-with-ground foot 13 is, in other words, the observation value of the actual displacement amount of each joint between the base body 2 (a first particular link) and the in-contact-with-ground foot 13 (the in-contact-with-ground link).

The forward kinematics arithmetic section 74 calculates, on each of the two in-contact-with-ground feet 13, the temporary estimated values Xb_temp and Qb_temp of the position and the attitude of the base body 2 by using the calculated values of the position and the attitude of each of the in-contact-with-ground feet 13 in the double stance phase. Further, in the single stance phase, the forward kinematics arithmetic section 74 calculates the temporary estimated values Xb_temp and Qb_temp of the position and the attitude of the base body 2 by using the calculated values of the position and the attitude of one of the in-contact-with-ground feet 13.

Subsequently, the link position and attitude estimating unit 54 subjects the temporary estimated values Xb_temp and Qb_temp of the position and the attitude of the base body 2 to the processing in an averaging section 75. The averaging section 75 determines the mean value (the addition mean value) of the Xb_temp and the mean value (the addition mean value) of the Qb_temp calculated in the forward kinematics arithmetic section 74 for each of the two in-contact-with-ground feet 13, 13 in the double stance phase. Further, in the single stance phase, the averaging section 75 directly outputs Xb_temp and Qb_temp calculated in the forward kinematics arithmetic section 74.

Then, the link position and attitude estimating unit 54 subjects each of the output values of the position and the attitude of the base body 2 obtained by the processing in the averaging section 75 to the low-pass characteristic filtering through a low-pass filter 76 thereby to determine the estimated values Xb_estm and Qb_estm of the actual current position and the actual current attitude, respectively, of the base body 2 and outputs the estimated values Xb_estm and Qb_estm.

Further, the link position and attitude estimating unit 54 carries out the processing in a forward kinematics arithmetic section 77, which is separate from the forward kinematics arithmetic section 74, in the single stance phase. In the processing in the forward kinematics arithmetic section 77, the link position and attitude estimating unit 54 calculates estimated values Xswg_estm and Qswg_estm of the actual current position and the actual current attitude, respectively, of the foot 13 of the not-in-contact-with-ground leg link mechanism 3 (the not-in-contact-with-ground foot 13) by carrying out the forward kinematics arithmetic processing on the basis of the estimated values Xb_estm and Qb_estm of the actual current position and the actual current attitude, respectively, of the base body 2 and the observation value θi_act (the current value) of the actual displacement amount of each joint of the not-in-contact-with-ground leg link mechanism 3, which have been determined as described above, and outputs the calculated estimated values Xswg_estm and Qswg_estm.

Supplementarily, the observation value θi_act of the actual displacement amount of each joint of the not-in-contact-with-ground leg link mechanism 3 is, in other words, the observation value of the actual displacement amount of each joint between the base body 2 (the first particular link) and the not-in-contact-with-ground foot 13 (the second particular link).

The present embodiment is the same as the first embodiment except for the processing by the link position and attitude estimating unit 54 described above. In the present embodiment, the attitude sensor 42 may be omitted.

Supplementarily, the processing in the elastic deformation amount estimating section 71 and the processing in the arithmetic sections 72, 73 in the present embodiment correspond to the seventh processing and the eighth processing, respectively, in the present invention. The processing carried out by the forward kinematics arithmetic section 74, the averaging section 75, and the low-pass filter corresponds to the sixth processing in the present invention.

The desired position and attitude Xsup_ref and Qsup_ref of each of the in-contact-with-ground feet 13, the elastic deformation amounts dXsup and dQsup, and the processing in the forward kinematics arithmetic section 74 can be alternatively expressed in the form of, for example, the homogeneous transformation matrices. In this case, multiplying the homogeneous transformation matrices makes it possible to determine the temporary estimated values Xb_temp and Qb_act_temp of the position and the attitude of the base body 2.

According to the present embodiment, the link position and attitude estimating unit 54 acquires, at each control processing cycle, the desired position Xsup_ref and the desired attitude Qsup_ref of each of the in-contact-with-ground feet 13, the observation value θi_act of the actual displacement amount of each joint of each of the leg link mechanisms 3, and the observation value Fc_act of the load acting on each of the in-contact-with-ground feet 13 as the input parameters. Then, the link position and attitude estimating unit 54 determines the estimated values Xb_estm, Qb_estm, Xswg_estm, and Qswg_estm of the actual positions and attitudes of the base body 2 and the not-in-contact-with-ground foot 13 from the input parameters by carrying out the processing described above.

The processing by the link position and attitude estimating unit 54 is carried out on the assumption that the desired position Xsup_ref and the desired attitude Qsup_ref of each of the in-contact-with-ground feet 13 constrained relative to an external object by its contact with the ground agree with the actual position and the actual attitude, respectively, thereof.

In this case, the differences (the difference in position and the difference in attitude) between the estimated values Xswg_estm and Qswg_estm of the position and attitude of the not-in-contact-with-ground foot 13 and the desired position and attitude Xswg_ref and Qswg_ref are reflected in the adjustment of the desired driving force for each joint of each of the leg link mechanisms 3. This makes it possible to achieve a higher degree of agreement between the actual position and attitude of the in-contact-with-ground foot 13 and the desired position and attitude Xsup_ref and Qsup_ref in a state, in which the not-in-contact-with-ground foot 13 comes in contact with the ground and becomes the in-contact-with-ground foot 13.

Further, the elastic deformation amounts dXsup and dQsup of each of the in-contact-with-ground feet 13 calculated on the basis of the observation value Fc_act of the load acting on the in-contact-with-ground feet 13 are reflected in the estimated values Xb_estm and Qb_estm of the position and attitude of the base body 2. This makes it possible to properly compensate for the influence of the elastic deformation of the in-contact-with-ground foot 13.

Further, in the double stance phase, in which the two leg link mechanisms 3L, 3R have the in-contact-with-ground feet 13, the temporary estimated values Xb_temp and Qb_temp of the position and attitude of the base body 2 calculated for each of the in-contact-with-ground links 13 are averaged.

Further, the observation value θi_act of the actual displacement amount of each joint of each of the leg link mechanisms 3 can be obtained with relatively high accuracy from a detection signal of a joint displacement sensor 43.

As a result, the estimated values Xb_estm, Qb_estm, Xswg_estm, and Qswg_estm of the actual positions and attitudes of the base body 2 and the not-in-contact-with-ground foot 13 can be obtained with high reliability.

As described above, the link position and attitude estimating unit 54 is capable of sequentially determining the highly reliable estimated values Xb_estm, Qb_estm, Xswg_estm, and Qswg_estm by simple processing without the need for complicated arithmetic processing.

Consequently, each joint of each of the leg link mechanisms 3 is controlled by the force control method, making it possible to properly prevent the actual motion of the robot 1 from deviating from a reference desired motion due to a change in an external force or the like acting on the robot 1.

Supplementarily, the description of the present embodiment given above has been focused mainly on the example in which the robot 1 travels in the two-leg gait motion. However, also in a four-leg gait travel motion, in which the arm link mechanisms 4L, 4R are moved also as the leg link mechanisms in addition to the leg link mechanisms 3L, 3R, the same processing as the processing by the link position and attitude estimating unit 54 described above can be carried out to determine the estimated values of the positions and the attitudes of the base body 2, each of the not-in-contact-with-ground feet 13, and each of the hands 23 not in contact with the ground, as supplementarily described in connection with the first embodiment.

[Modifications]

A description will now be given of some modifications related to the embodiments of the present invention.

In the embodiments described above, the description has been given of the example in which the base body 2 and the not-in-contact-with-ground foot 13 are defined as the first particular link and the second particular link, respectively, of the present invention. Alternatively, however, the first particular link may be a link other than the base body 2 (a link, such as the head 5 or the arm link mechanism 4). Further, the second particular link may be a link other than the not-in-contact-with-ground foot 13 (e.g. a link other than the foot 13 of the not-in-contact-with-ground leg link mechanism 3 or the hand 23 of the arm link mechanism 4).

The embodiments described above include the elastic deformation amount estimating sections 62 and 71. However, the elastic deformation amount estimating sections 62 and 71 may be omitted if the stiffness of the feet 13 (the in-contact-with-ground links) is relatively high.

For example, in the first embodiment, the elastic deformation amount estimating section 62 and the arithmetic section 63 may be omitted, and the temporary value Xsup_temp1 calculated by the forward kinematics arithmetic section 61 in place of the value calculated by the arithmetic section 63 may be directly input to the arithmetic section 64.

Further, for example, in the second embodiment, the elastic deformation amount estimating section 71 and the arithmetic sections 72, 73 may be omitted, and the desired position Xsup_ref and the desired attitude Qsup_ref of each of the in-contact-with-ground feet 13 in place of the values calculated by the arithmetic sections 72, 73 may be directly input to the forward kinematics arithmetic section 74.

In the embodiments described above, the averaging sections 66 and 75 may be omitted. For example, in the first embodiment, the position of the base body 2 calculated for one in-contact-with-ground foot 13 by the arithmetic section 65 may be input to the low-pass filter 67 to determine the estimated value Xb_estm of the position of the base body 2 not only in the single stance phase of the robot 1 but also in the double stance phase thereof.

Similarly, in the second embodiment, the temporary estimated value Xb_temp of the position of the base body 2 calculated for one in-contact-with-ground foot 13 by the forward kinematics arithmetic section 74 may be input to the low-pass filter 76 to determine the estimated value Xb_estm of the position of the base body 2 not only in the single stance phase of the robot 1 but also in the double stance phase thereof.

The embodiments described above are provided with the low-pass filters 67 and 76. Alternatively, however, the embodiments may be configured without the low-pass filters 67 and 76.

In the embodiments described above, the actual positions and attitudes of the base body 2 and the not-in-contact-with-ground foot 13 have been estimated. However, for example, the position and attitude or the position of one of the base body 2 and the not-in-contact-with-ground foot 13 may be estimated, and the desired driving force for each joint of each of the leg link mechanisms 3 may be adjusted (the reference desired driving force may be revised) according to the difference between the estimated values or value and the desired values or value.

In the embodiments described above, the loads acting on the in-contact-with-ground feet 13 have been detected by the force sensors 44. Alternatively, however, the loads may be estimated by using, for example, an inverse kinematics model. The same applies to the case where the hand or hands 23 of the robot 1 are brought into contact with the ground when the robot 1 travels.

What is claimed is:

1. A controller for a mobile robot, which has a plurality of links which include a link constituting a base body and links constituting a plurality of leg link mechanisms extended from the base body and which are interconnected through a plurality of joints, and joint actuators for driving each of the joints, the controller being adapted to have the mobile robot travel by controlling driving forces to be imparted by the joint actuators to each of the joints for operating the leg link mechanisms according to a force control method, and the controller comprising at least one processor and a memory on which is installed a program which, when executed by the at least one processor, causes the controller to function as:

a link position and attitude estimating unit configured to sequentially acquire input parameters, which at least include at least one of a desired attitude of a ground contact link of at least one leg link mechanism including the ground contact link that is in contact with a ground among the leg link mechanisms and an observation value of an actual attitude of a first particular link determined in advance among the plurality of links of the mobile robot, a desired position of the ground contact link, and an observation value of an actual displacement amount of each joint between the ground contact link and the first particular link, and to sequentially estimate the actual position and attitude of the first particular link by carrying out processing, which includes at least forward kinematics arithmetic processing, by using the input parameters; and a joint driving force control unit configured to adjust, through the joint actuators, a driving force to be imparted to each of the joints for operating the leg link mechanisms based on at least either one of a difference between estimated values of the actual position and attitude of the first particular link obtained by the link position and attitude estimating unit and desired position and attitude of the first particular link or a difference between estimated values of actual position and attitude of a second particular link, which is different from the first particular link and which is not in contact with a ground, among the plurality of links of the mobile robot, which are estimated values of the actual position and attitude of the second particular link calculated by forward kinematics arithmetic processing based on the estimated values of the actual position and attitude of the first particular link and an observation value of a displacement amount of each joint between the first particular link and the second particular link, and desired position and attitude of the second particular link, such that the difference is reduced.

2. The controller for the mobile robot according to claim 1, wherein the second particular link is a link of a distal end portion of each of the leg link mechanisms, the link position and attitude estimating unit is configured to sequentially estimate the actual position and attitude of the first particular link and also to sequentially estimate actual position and attitude of the link of the distal end portion by forward kinematics arithmetic processing from the estimated values of the actual position and attitude of the first particular link and an observation value of a displacement amount of each joint between the first particular link and the link of the distal end portion while the link of the distal end portion is moving in air in a travel motion of the mobile robot, and the joint driving force control unit is configured to adjust, through the joint actuators, the driving force to be imparted to each of the joints for operating the leg link mechanisms based on at least a difference between the estimated values of the actual position and attitude of the link of the distal end portion and a desired position and attitude of the link of the distal end portion such that the difference is reduced while the link of the distal end portion is moving in the air in the travel motion of the mobile robot.

3. The controller for the mobile robot according to claim 1, wherein the input parameters include the observation value of the actual attitude of the first particular link, and the link position and attitude estimating unit is configured to carry out, at a time of determining a new estimated value of the actual position of the first particular link, first processing in which forward kinematics arithmetic processing is carried out based on a current value of the observation value of the actual attitude of the first particular link, a latest value among the estimated values of the actual position of the first particular link determined in the past, and a current value of the observation value of the actual displacement amount of each joint between the ground contact link and the first particular link thereby to calculate a temporary value of a position of the ground contact link in a case where it is assumed that an actual current position of the first particular link agrees with the latest value, and second processing of determining a new estimated value of the actual position of the first particular link by correcting the latest value based on a difference between the temporary value of the position of the ground contact link and the desired position of the ground contact link, and to define the observation value of the actual attitude of the first particular link as the estimated value of the actual attitude.

4. The controller for the mobile robot according to claim 3,
wherein the input parameters further include an observation value of an actual load acting on the ground contact link, and
the link position and attitude estimating unit is configured to further carry out third processing of estimating an amount of an elastic deformation of the ground contact link by using the observation value of the actual load and fourth processing of correcting the temporary value of the position of the ground contact link calculated by the first processing based on an estimated value of the amount of the elastic deformation, and to correct the latest value based on a difference between a corrected value of the temporary value of the position of the ground contact link obtained by the fourth processing and the desired position of the ground contact link in place of a difference between the temporary value of the position of the ground contact link and the desired position of the ground contact link in the second processing, thereby determining a new estimated value of the actual position of the first particular link.

5. The controller for the mobile robot according to claim 4,
wherein the link position and attitude estimating unit is configured to carry out the first processing, the third processing, and the fourth processing for each ground contact link in a phase during which each of the plurality of the leg link mechanisms has the ground contact link in the travel motion of the mobile robot, and to determine a new estimated value of the actual position of the first particular link by averaging the estimated values of the actual position of the first particular link obtained for each ground contact link by correcting the latest value based on the difference between the corrected value of the temporary value of the position of each ground contact link and the desired position of the ground contact link or by subjecting the value, which has been calculated by the averaging process, to a low-pass characteristic filtering process in the second processing.

6. The controller for the mobile robot according to claim 3,
wherein the link position and attitude estimating unit is configured to carry out the first processing for each ground contact link in a phase during which each of the plurality of the leg link mechanisms has the ground contact link in the travel motion of the mobile robot, and to determine a new estimated value of the actual position of the first particular link by averaging the estimated values of the actual position of the first particular link obtained for each ground contact link by correcting the latest value based on a difference between the temporary value of the position of each ground contact link and the desired position of the ground contact link or by subjecting the value, which has been calculated by the averaging process, to a low-pass characteristic filtering process in the second processing.

7. The controller for the mobile robot according to claim 1,
wherein the input parameters include the desired attitude of the ground contact link, and
the link position and attitude estimating unit is configured to determine new estimated values of the actual position and attitude of the first particular link by carrying out sixth processing when determining the new estimated values of the actual position and attitude of the first particular link by the forward kinematics arithmetic processing based on current values of the desired position and attitude of the ground contact link and a current value of the observation value of the actual displacement amount of each joint between the ground contact link and the first particular link.

8. The controller for the mobile robot according to claim 7,
wherein the input parameters further include an observation value of an actual load acting on the ground contact link, and
the link position and attitude estimating unit is configured to further carry out seventh processing of estimating an amount of an elastic deformation of the ground contact link by using the observation value of the actual load and eighth processing of correcting the current values of the desired position and attitude of the ground contact link by using an estimated value of the amount of the elastic deformation, and to determine new estimated values of the actual position and attitude of the first particular link by using the corrected values, which have been obtained by the eighth processing, in place of the current values of the desired position and attitude of the ground contact link in the sixth processing.

9. The controller for the mobile robot according to claim 8,
wherein the link position and attitude estimating unit is configured to carry out the seventh processing and the eighth processing for each ground contact link in a phase during which each of the plurality of the leg link mechanisms has a ground contact link in the travel motion of the mobile robot and also to determine the new estimated values of the actual position and attitude of the first particular link by averaging the estimated values of the position and attitude of the first particular link calculated for each ground contact link by the forward kinematics arithmetic processing based on the corrected values of the current values of the desired position and attitude of each ground contact link and the current value of the observation value of the actual displacement amount of each joint between the ground contact link and the first particular link or subjecting the values calculated by the averaging process to a low-pass characteristic filtering process in the sixth processing.

10. The controller for the mobile robot according to claim 7,
wherein the link position and attitude estimating unit is configured to determine the new estimated values of the actual position and attitude of the first particular link by averaging the estimated values of the position and attitude of the first particular link, which are calculated for each ground contact link by the forward kinematics arithmetic processing based on the current values of the desired position and attitude of each ground contact link and the current value of the observation value of the actual displacement amount of each joint between the ground contact link and the first particular link, or by subjecting the values calculated by the averaging process to a low-pass characteristic filtering process in the sixth processing in a phase during which each of the plurality of the leg link mechanisms has the ground contact link in the travel motion of the mobile robot.

* * * * *